USOO5475592A

United States Patent [19]
Wnuk et al.

[11] Patent Number: 5,475,592
[45] Date of Patent: Dec. 12, 1995

[54] OPTICAL PLUG-IN MEMORY PACK FOR POSITIONING CONTROL

[75] Inventors: Joseph Wnuk, Westland; Lawrence T. Wargo, Clinton Township, both of Mich.

[73] Assignee: United Technologies Automotive, Inc., Dearborn, Mich.

[21] Appl. No.: 327,055

[22] Filed: Oct. 21, 1994

[51] Int. Cl.$^6$ ................................. B60N 2/02; G05D 3/00
[52] U.S. Cl. ................. 364/424.05; 361/728; 318/568.1; 307/10.1
[58] Field of Search .................... 364/424.01, 424.05; 318/568.1; 296/65.1; 307/9.1, 10.1; 439/34, 43; 361/760, 728

[56] References Cited

U.S. PATENT DOCUMENTS

| | | | |
|---|---|---|---|
| 4,689,537 | 8/1987 | Mizuta et al. | 318/568 |
| 5,040,990 | 8/1991 | Suman et al. | 439/34 |
| 5,164,645 | 11/1992 | Furuse et al. | 318/467 |
| 5,303,121 | 4/1994 | Thornberg | 361/760 |

*Primary Examiner*—Michael Zanelli
*Attorney, Agent, or Firm*—Howard & Howard

[57] ABSTRACT

A universal control board is disclosed that allows the easy connection of an optional memory function for a vehicle component positioning control. The universal control board includes a well that receives a plug-in memory pack to provide the memory function. In this way, the assembler need only have tools and assembly steps required for assembly of the universal control board. The assembler may easily plug in the memory option where appropriate.

20 Claims, 2 Drawing Sheets

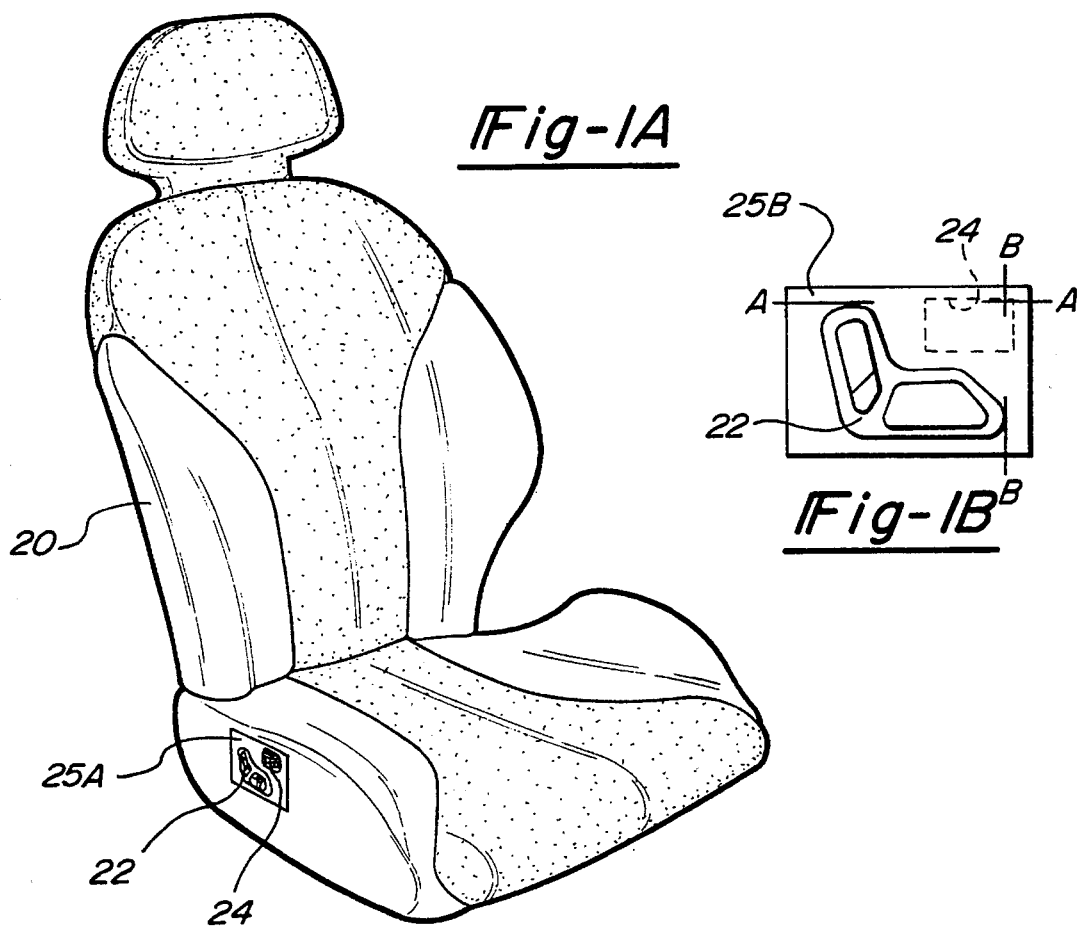
Fig-1A
Fig-1B
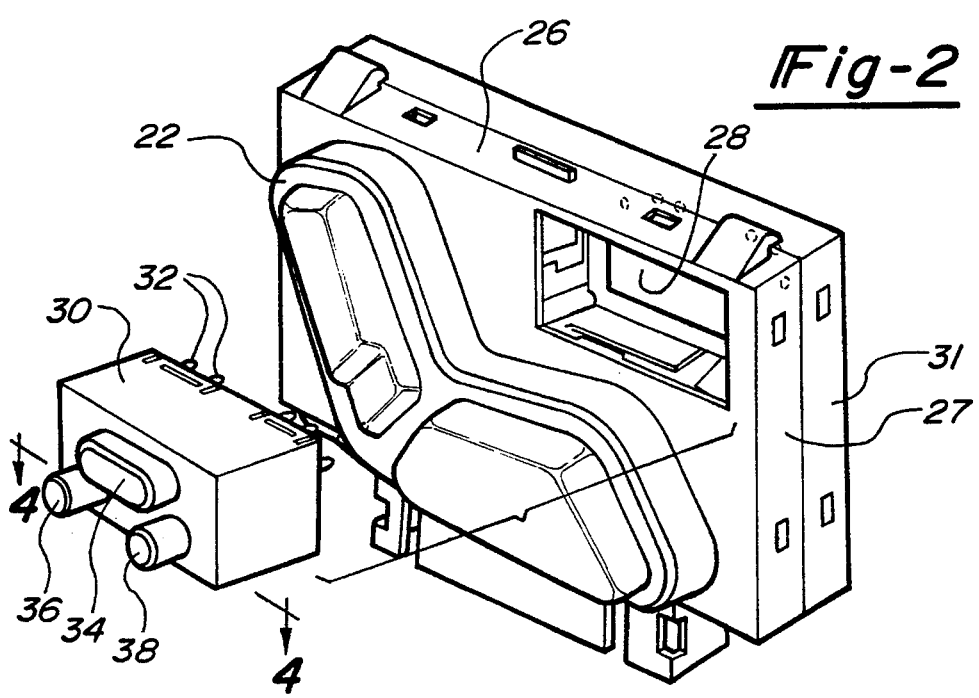
Fig-2

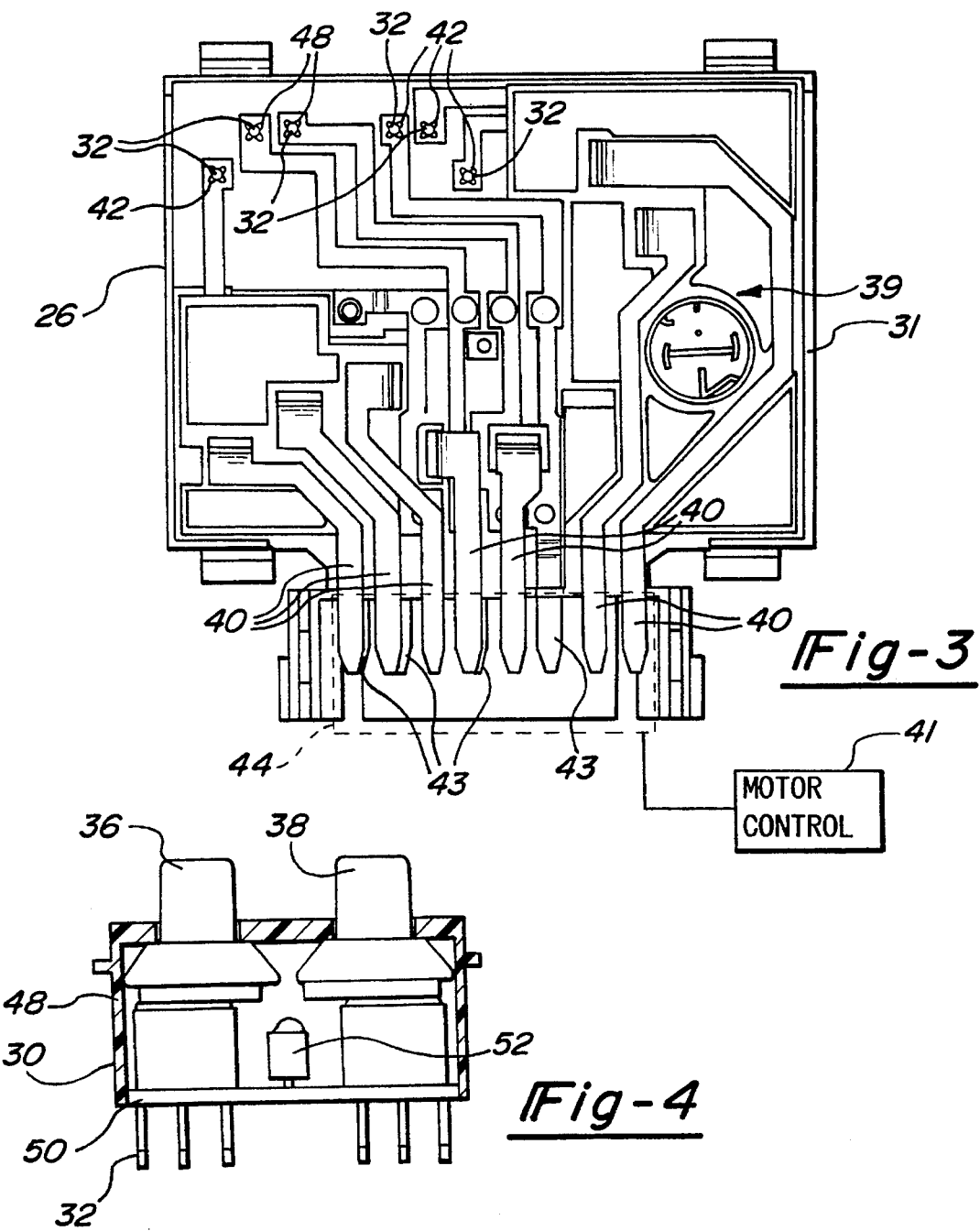

OPTICAL PLUG-IN MEMORY PACK FOR POSITIONING CONTROL

This invention relates to a unique switch for positioning vehicle components that allows the optional connection of a memory function.

The provision of a memory function to vehicle component positioning systems has gained wide acceptance in recent years. The memory function allows a particular rider to tailor the position of a vehicle component, such as the seat, mirrors, etc., to the position desired for that individual. The memory system will typically allow selection and storage of desired positions for at least two individuals. As an example, a husband and wife may both have their individual seat positions stored within a memory associated with the seat positioning system.

While memory functions are gaining wide acceptance, the optional provision of the memory function complicates assembly. Positioning systems that do not include the memory function must still be provided. The memory function is typically provided as an option, and a large percentage of the positioning systems are still assembled without the memory function.

The prior art switch controls used to provide the memory function includes a separate memory positioning control, used in place of a non-memory positioning control when the memory option is selected. Different tooling and assembly steps must be made available to the assembler for incorporation of the non-memory and the memory controls.

In addition, there is a desire in modem assembly operations to have components pre-assembled. The necessity of having distinct controls for memory and non-memory functions makes it more difficult to pre-assemble vehicle components. As an example, in the prior art, a vehicle door panel which incorporates a positioning switch control may not be easily pre-assembled, since distinct control boards would have to be incorporated into the door panel for memory and non-memory functions.

It is a desire of modern assembly lines to minimize the required number of tools or distinct assembly steps. Further, it is a desire to provide as much flexibility for assembly and pre-assembly as is possible. Thus, it would be desirable to eliminate the necessity of separate switches for inclusion of the memory option.

SUMMARY OF THE INVENTION

The present invention provides an optional memory function by a universal positioning switch control board which also controls the manual positioning function. The inventive control board incorporates a circuit board that may optionally receive a piggy-back memory pack. The control board includes connections to be connected to a wire harness extending between the control board and the positioning motor control. When the memory pack is attached to the control board, memory signals can pass from a memory switch to the motor control. If no memory pack is included, (i.e., when the option is not elected), then no memory signals pass to the motor control. However, the assembly of the universal control board remains the same whether the memory function is elected or not. Only the additional step of inserting the memory pack is required.

In preferred embodiments of this invention, the memory pack plugs into a well adjacent to the manual positioning switch. When the memory option is not utilized, a cover for the manual switch also covers and encloses the well, thus improving the appearance of the overall switch assembly. In further features the memory pack has interference fit plug-in connections that plug into terminals in the circuit board.

In a disclosed embodiment, the positioning control is a vehicle seat position control. The manual switch takes the shape of a vehicle seat, and is generally L-shaped. The well which is to receive the optional memory pack is within the opening of the L, such that the well is adjacent to the manual switch to minimize the total area required by the switches. A single cover thus may easily enclose the well when the option is not elected. The majority of the well is most preferably within the boundaries of an area defined by lines extending perpendicular to the opposed ends of the L-shaped manual switch; again this positioning minimizes the required size of the cover.

In a method according to the present invention, a positioning control board is provided that optionally receives a plug-in memory pack. The memory pack is operable to initiate movement of the component controlled by the positioning switch to a pre-set desired location. A determination is made as to whether the memory option is desired. If the option is desired, the plug-in memory pack is inserted into the control board. In some instances, there may be distinct wiring harnesses for memory and non-memory options. In that case, the appropriate wiring harness would be connected to the control board.

The memory function itself operates as in the prior art. An operator can manually position a component, such as a seat, mirror, etc., to a desired position, and then set that position with a desired memory signal. The memory, which is typically a part of a component positioning motor control, associates that position with a particular memory signal. When a memory signal is sent to the motor control, the motor control moves the component to the desired memory position.

These and other features of the present invention can be best understood from the following specification and drawings, of which the following is a brief description.

BRIEF DESCRIPTION OF THE DRAWINGS

FIG. 1A shows the inventive combination of a manual control switch and an optional memory pack.

FIG 1B shows the inventive control without the memory function.

FIG. 2 is an assembly view of one embodiment of the inventive control board.

FIG. 3 is a view of the circuit board for the control board, schematically showing a connection to a motor control.

FIG. 4 is a cross-sectional view through the memory pack of the present invention.

DETAILED DESCRIPTION OF A PREFERRED EMBODIMENT

FIG. 1A shows a seat 20 incorporating a manual positioning switch 22. In this embodiment, manual switch 22 is a seat positioning switch allowing for movement of vehicle seat 20. The operation and construction of manual switch 22 are as known in the prior art. It should be understood that the present invention extends to other types of vehicle component positioning controls, such as those used for mirrors, etc. Mounted adjacent to the manual switch 22 is a memory switch 24. A switch cover 25A covers both switches. As is known in the art, a memory switch allows an operator to tailor the position of the vehicle component to a desired position and store that position in memory. The memory switch typically allows at least two positions to be stored. A first operator may enter the vehicle, depress the memory switch 1, and a motor control for the positioning of the component would then move the component to the stored memory position 1. The second operator's position may be stored as memory position 2.

As shown in FIG. 1A, the option of a memory has been exercised. As described above, the memory option is not always exercised, and in many cases, only a manual switch is provided. In the prior art, this has lead to complications in assembling positioning controls between those with memories and those without, due to the different required switches. The inventive system addresses this problem by providing a universal positioning control board that is utilized whether the memory function is elected or not.

As shown in FIG. 1B, the memory option has not been exercised. A cover, such as cover 25B, surrounds the manual switch 22, and also covers the well (shown in phantom at 24) where the memory switch was received in FIG. 1A. Since the memory switch is mounted adjacent to the manual switch, cover 25B can easily enclose the well that is provided for receipt of the optional memory pack.

As shown in FIGS. 1A and 1B, since the location of the memory switch 24 is generally within the opening above the L-shaped manual switch 22, the size of cover 25B may be relatively small. The majority of the area of memory switch 24 is within the boundaries of an area defined by lines A—A, and B—B which extend perpendicular from the opposed ends of the L-shaped manual switch. Thus, the area covered by memory switch 24 and manual switch 22 is minimized, and cover 25B may also be relatively small.

As shown in FIG. 2, a universal positioning control board 26 includes a plastic front housing 27 defining a well 28 for receipt of optional memory pack 30. Another opening receives manual switch 22. Memory pack 30 includes a number of plug-in pin connectors 32 which are received in mating terminals on a circuit board on the rear of control board 26. Plastic rear housing 31 is connected to front housing 27. Memory pack 30 includes a set button 34, and two memory buttons, 36 and 38. The operation of the memory function itself forms no portion of this invention. As is commonly known, an operator may set a desired position in a memory associated with either memory button, 36 or 38. Once the desired position is set, the operator need only depress one memory button, 36 or 38, and the positioning motor control moves the component to the desired position.

FIG. 3 shows the circuit board 39 associated with the rear of universal control board 26. A number of connectors 40 receive connections from a wire harness 44, shown schematically, to connect the manual switch 22 to a motor control 41. A number of terminals 42 selectively receive the ends of pin connections 32 from the back of memory pack 30. The optional memory pack 30 is shown inserted in FIG. 3 with pins 32 interference fit into terminals 42. Terminals 42 lead to connections 43, which communicate the signals from memory pack 30 to the motor control 41 through wire harness 44. The wire harness 44 may be different where the memory pack 30 is not utilized. The wire harness 44 need not include connection for memory connections 43 when the memory option is not utilized. These connections 43 are positioned in a plane nearer to the center of control board 26 than are connections 40. This facilitates the attachments of the optional wire harnesses. Optionally, the same wire harness 44 could be used for both memory and non-memory systems, but there will simply be no signals sent through connections 43.

As shown in FIG. 4, memory pack 30 includes an outer housing 48 and a circuit board 50. Outer housing 48 is received within well 28 with pins 32 received in terminals 42. A light 52 is received on board 50 to light the switches 34, 36 and 38.

As should be appreciated, the optional memory pack 30, and the universal control board 26, only require the assembler to assemble the same part, regardless of whether the memory option is exercised. This reduces the number of distinct tools and assembly steps that must be taken at the assembly line. Further, more preassembly freedom is provided. As such, the inventive use of the universal control board provides valuable benefits to an assembler. The ease of connection of the memory function also provides assembly benefits.

In a method according to the present invention, the universal control board 26 is provided, along with the optional memory pack 30. A determination is made as to whether a particular vehicle is to include the memory option. If the particular vehicle does include the memory option, control board 26 is assembled with memory pack 30 and plate 25A. If the particular vehicle does not include the memory option, then the control board 26 is assembled without a memory pack. Preferably, a plate 25B is used to cover the location of the memory pack. In some instances, distinct wiring harnesses may be utilized between the memory and non-memory options. If the distinct wiring harnesses are utilized, then the wiring harness used in the non-memory option need not include connections for memory connections 43.

Although a preferred embodiment of this invention has been disclosed, a worker of ordinary skill in the art would recognize that certain modifications would come within the scope of this invention. For that reason, the following claims should be studied to determine the true scope and content of this invention.

We claim:

1. A vehicle component positioning control comprising:

a. a motor control for positioning a vehicle component;

b. a universal control board having a manual switch, and connections to communicate signals from said manual switch to said motor control; and c. said universal control board selectively receiving a plug-in memory pack, said memory pack comprising electrical circuitry for communicating memory signals through connections on said control board and to said motor control, such that said memory pack may be selectively connected to said control board when a memory option is desired.

2. A vehicle component positioning control as recited in claim 1, wherein said memory pack comprises a plurality of pins which are interference fit into terminals in a circuit board associated with said control board.

3. A vehicle component positioning control as recited in claim 2, wherein said memory pack provides the option of preselecting at least two memory positions.

4. A vehicle component positioning control as recited in claim 1, wherein said memory pack is received in a well adjacent to said manual switch, such that said control board requires a minimum of space.

5. A vehicle component positioning control as recited in claim 4, wherein an optional switch cover is utilized in combination with said control board when said memory option is not elected, and said optional switch cover covers said well.

6. A vehicle component positioning control as recited in claim 5, wherein said motor control is a control for a seat position, said manual switch being shaped like a seat, with a generally L-shape, and the majority of said memory pack well being received within an area is defined by lines extending perpendicular from the opposed ends of said L-shaped manual switch.

7. A universal control board for a vehicle component positioning control comprising:
   a. a universal circuit board;
   b. a manual switch, said manual switch associated with electrical connections on said universal circuit board to communicate with a positioning control;
   c. a well including openings associated with terminals on said universal control board, said terminals associated with electrical connections on said universal control board to communicate with said positioning control; and
   d. an optional memory pack, said memory pack comprising pin connections to be selectively inserted into said well and through said openings, and to mate with said terminals in said circuit board, said memory pack further comprising memory buttons to provide a memory function to said universal control board, and said memory switches communicating to said positioning control through said circuit board.

8. A universal control board as recited in claim 7, wherein said connections on said memory pack are interference fit into terminals in said circuit board.

9. A universal control board as recited in claim 8, wherein said memory pack provides the option of preselecting at least two memory positions.

10. A universal control board as recited in claim 7, wherein said well is formed adjacent to said manual switch, such that said control board occupies a minimum of space.

11. A universal control board as recited in claim 10, wherein an optional switch cover is utilized in combination with said control board when a memory option is not elected, with said optional switch cover covering said well.

12. A universal control board as recited in claim 11, wherein said circuit board is part of a control for a vehicle seat position, said manual switch being shaped like a seat, with a generally L-shape, and said memory pack well being received within the opening of said L-shape.

13. A universal control board as recited in claim 12, wherein an area is defined by lines extending perpendicular from the opposed ends of said L-shaped manual switch, and the majority of said well being received within said area.

14. A method of providing positioning control to a vehicle component comprising the steps of:
   a. providing a universal control board comprising a manual control for sending control signals to a positioning motor control for a vehicle component;
   b. providing an optional memory pack which can be optionally plugged into said universal control board;
   c. determining whether a particular vehicle is to include a memory option;
   d. plugging said optional memory pack into a well on said control board when said memory option is to be utilized with a particular vehicle; and
   e. covering said well which receives said memory pack when said memory option is not elected.

15. A method as recited in claim 14, wherein distinct wiring harnesses are provided, depending upon whether said memory is elected or not, and connecting the appropriate wiring harness to said universal control board dependant upon whether said memory option is elected.

16. A component positioning control comprising:
   a. a motor control for positioning a component;
   b. a universal control board having a manual switch, and connections to communicate signals from said manual switch to said motor control; and
   c. said universal control board selectively receiving a plug-in memory pack, said memory pack comprising electrical circuitry for communicating memory signals through connections on said control board and to said motor control, such that said memory pack may be selectively connected to said control board when a memory option is desired.

17. A component positioning control as recited in claim 16, wherein said memory pack comprises a plurality of pins which are interference fit into terminals in a circuit board associated with said control board.

18. A component positioning control as recited in claim 17, wherein said memory pack provides the option of preselecting at least two memory positions.

19. A component position control as recited in claim 16, wherein said component is a seat.

20. A component positioning control as recited in claim 16, wherein said component is mounted on a vehicle.

* * * * *